Nov. 6, 1951  J. W. B. BARGHAUSEN ET AL  2,573,823
ALTIMETER ACTUATED BY COSMIC RAYS
Filed April 20, 1948

INVENTORS:
JOHN W. B. BARGHAUSEN
JAMES A. VAN ALLEN
BY

ATTORNEY

Patented Nov. 6, 1951

2,573,823

UNITED STATES PATENT OFFICE 2,573,823

ALTIMETER ACTUATED BY COSMIC RAYS

John W. B. Barghausen, Mount Rainier, and James A. Van Allen, Silver Spring, Md., assignors to the United States Government as represented by the Secretary of the Navy Application April 20, 1948, Serial No. 22,124

1 Claim. (Cl. 250—83.6)

The present invention relates to an altimeter actuated by cosmic rays, for determining relatively great altitudes, for example, in the range of approximately 3 to 20 miles above sea level.

An object of the invention is to provide the necessary procedure and apparatus to accomplish this, said apparatus comprising Geiger counters together with auxiliary devices to provide automatic operation thereof, the whole being capable of being arranged compactly to provide an instrument that may be used in aviation.

The invention depends on the fact that the intensity of cosmic rays is a known and varying function of altitude, the numerical values of which are now known up to at least 500,000 feet. Geiger counters, sufficiently numerous to reduce accidental errors to a harmless value, are provided as measuring means for the cosmic ray activity, and by providing, say, two sets of five such counters each, connected in a coincidence circuit, altitude determinations within about ±1000 feet may be obtained, in the range covering approximately 15,000–100,000 feet While the utility of this form of altimeter ceases at altitudes exceeding this value, for lack of variability of cosmic radiation above this height, nevertheless it more than suffices for any altitude likely to be reached by aircraft.

Altimeters heretofore used in aviation depended on the atmospheric pressure, which, as is well known, decreases from a nominal 15 lbs. per square inch at sea level to a very small value in the upper regions of the atmosphere. These former instruments are open to two objections, one being that obviously changes in barometric pressure affect the readings of such altimeters, as they are themselves merely modified aneroid barometers. The second, and more serious, objection is that while the rate of variation of atmospheric pressure with altitude is fairly great at relatively small altitudes, it decreases exponentially and becomes too small to yield accurate readings in the higher regions of the atmosphere. Hence, at about three miles these altimeters are not as reliable as might be desired, and at about this level altitudes deduced from the intensity of cosmic radiation begin to become reasonably accurate. A further disadvantage of this type of altimeter is that its readings are affected by dynamic pressure of the air, when the aircraft is in a dive for example. The cosmic-ray altimeter thus fortunately supplements the range of the barometric type of altimeter, as it becomes effective at about the same general height that the barometric type begins to become too insensitive.

Figure 1:
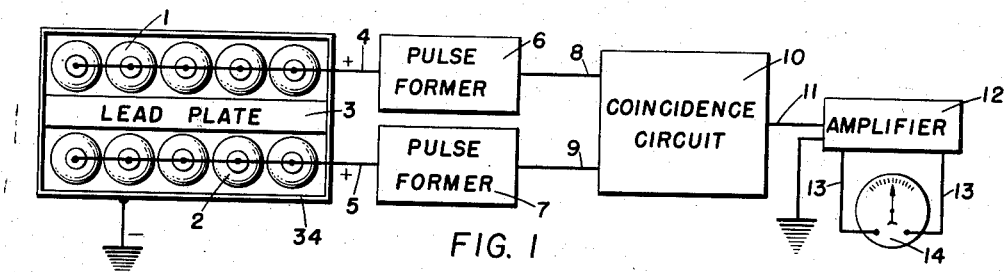
Fig. 1 is a block diagram of the apparatus used.

Referring first to Fig. 1, two sets or "trays" of Geiger tubes 1 and 2 are shown, each set comprising an arbitrary number of similar tubes. While five tubes are shown in each tray, it will be understood that the exact number is not critical and as many tubes may be used as convenient. Obviously, a compromise is sometimes desirable, because the available space or considerations of expense may limit the number that can be employed in any given case. However, as the function to be evaluated is of statistical nature, too few tubes may cause serious error because of non-uniform distribution of the cosmic radiation, while on the other hand too many will reduce the impedance excessively, inasmuch as all the Geiger tubes are connected in parallel.

Figure 2:
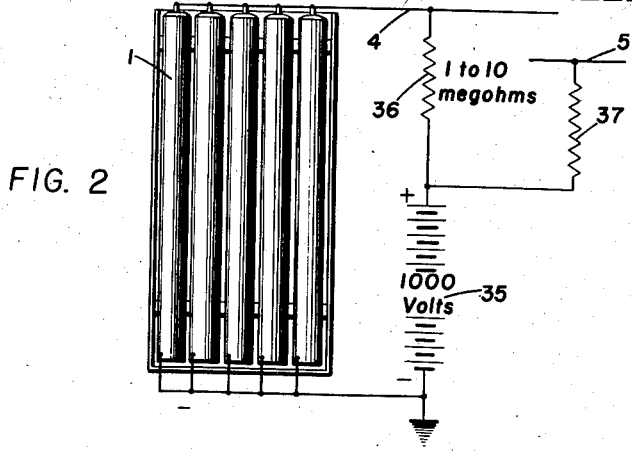
Fig. 2 is a diagrammatic plan of a tray of Geiger tubes.

As shown in Fig. 2, the central wires of the Geiger tubes 1 are connected to the wire 4 which is maintained normally at a high positive potential with respect to the grounded containers of the tubes, which constitute the companion negative electrodes.

The voltage is provided to wires 4 and 5 by a source 35 such as a high-voltage battery, here shown as 1000 volts, with relatively large resistors 36 and 37 in series, each say of the order of 1 to 10 megohms.

This resistor limits the current that can flow through the Geiger tubes to a safe value, and also ensures that upon breaking down, the discharge stops very quickly, because of the relatively great voltage drop in the large resistance of resistor 36, which reduces the voltage across the tubes themselves to a value below that required to maintain the glow discharge through the gas therein.

Figure 3:
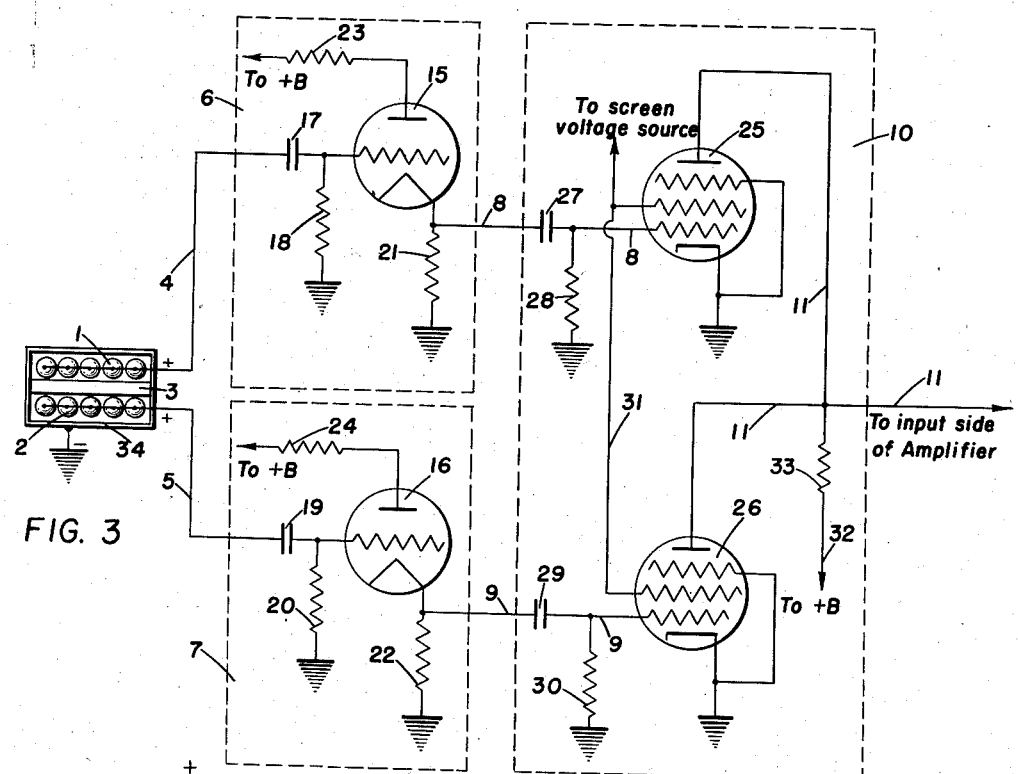
Fig. 3 is a circuit diagram.

The two trays 1 and 2 are superimposed, one on the other, and separated by a horizontally located plate 3 of lead, of considerable thickness, Figs. 1 and 3. All the tubes of tray 1 have their central wires connected to the conductor 4, and thus to the control grid of triode 15, through capacitor 17, there being also a high resistance grid resistor 18 through which the said grid is connected to ground, as shown.

Similarly, all the tubes of tray 2 have their central wires connected to conductor 5, and thus to the grid of triode 16 through capacitor 19, a grid resistor 20 being also connected as shown.

The cathode of triode 15 is connected to ground through a relatively high cathode resistor 21 and the cathode of triode 16 likewise is grounded, through a corresponding resistor 22. Anode voltage is supplied to the triodes through resistors 23 and 24, as shown. The assemblies shown within dotted rectangles 6 and 7 of Fig. 3 are the devices designated as "pulse formers" 6 and 7, in the block diagram, Fig. 1.

As shown in Fig. 1, the pulse formers are connected to the coincidence circuit 10 through conductors 8 and 9. The details of this circuit are shown in Fig. 3, within rectangle 10 thereof.

This circuit includes two electronic tubes, for example, the pentodes 25 and 26. The control grid of pentode 25 is connected to the cathode of triode 15 through the conductor 8, including the capacitor 27, a grid resistor 28 also being connected, as shown. Similarly, the control grid of pentode 26 is connected to the cathode of the triode 16 through conductor 9 and capacitor 29, a grid resistor 30 connecting said grid to the ground, as indicated.

The screens of the two pentodes are connected in parallel by conductor 31, which is maintained at a suitable voltage. The anodes of the pentodes are connected to one another by conductor 11, already shown in Fig. 1, which is one of the input conductors of the amplifier 12, the remaining input conductor being the ground. The anode-energizing power is supplied to the pentodes through conductor 32, which contains series resistor 33.

The output of the amplifier 12, Fig. 1, is fed through wires 13 to the galvanometer 14, to form a vacuum tube voltmeter. This instrument is constructed so as to be severely damped, either electrically or mechanically or both, so that its response is sluggish enough to be unaffected by the intermittent nature of the cosmic radiation, whereby the pointer assumes a steady average position.

The operation of the altimeter is as follows. Referring first to Fig. 1, let it be assumed that radiation from a generally vertical direction is striking the upper tray 1 of Geiger tubes. Any rays or particles of sufficient energy to pierce the outer casing 34 and any one of the tubes 1 therein will produce a discharge in said tube, which will be transmitted as a negative voltage pulse through the conductor 4 and capacitor 17, to the grid of triode 15. The reason for this is that the high positive potential of the central electrodes of the Geiger tubes is reduced very much when an internal discharge takes place, because of the large voltage drop in the resistor 36 when current flows therethrough.

This pulse traverses the capacitor 17 and reaches the grid of triode 15. The anode resistor 23 is large enough to prevent any large fluctuation of the anode current of said triode. The sudden change in grid potential causes a readjustment of the operating conditions of the triode, resulting in a change of cathode voltage. As this triode is connected in a cathode-follower circuit, the output through conductor 8 corresponds to a lower impedance, which better approaches matching the input impedance of the pentode 25.

The pulse through conductor 8 passes through capacitor 27 and thus to the grid of pentode 25, as a negative pulse, which increases the anode resistance of said pentode and thus would increase the anode voltage were it not that the anode of 25 is in parallel with the anode of the other pentode 26. The resistance of resistor 33 is relatively high, and therefore the voltage drop across 33 is large compared to the total B-voltage and hence the increase of anode resistance of pentode 25 has only a slight effect on its voltage as long as the anode resistance of the other pentode remains relatively low. Hence the voltage of conductor 11 does not rise very much when only pentode 25 is thus "pulsed."

It will be seen that a second pulsing circuit exactly like that just described connects the second tray 2 of Geiger tubes, the triode 16 and the pentode 26, and it operates exactly like the first circuit, hence is not further discussed here.

The lead plate 3, of the order of two centimeters thickness, for example, weeds out all particles having less than a certain penetrating power, and in effect allows only cosmic radiation to pass through it.

However, due to the very high speed of such particles, the time required to pass through both trays and the interposed lead plate is so small that it may be considered to be an instantaneous effect, or a coincidence in time.

Thus whenever the same cosmic particles traverse both trays, pulses will be generated in both pentodes at the same time, with the result that the anode circuits of both pentodes increase simultaneously in resistance and the voltage of conductor 11 drops sufficiently to operate the meter 14, Fig. 1, after amplification by the amplifier 12.

It will be seen that the galvanometer 14 and amplifier 12 constitute substantially a vacuum-tube voltmeter. The meter 14 itself is preferably highly damped or "ballistic" in character, so that it is sluggish enough in its response to indicate a mean value of the cosmic ray intensity instead of vibrating with the successive pulses. Moreover, the meter is preferably graduated in altitudes and not in voltages, so that it is direct-reading.

The operation of the apparatus has already become evident, from the description of its structures and circuits, but may be summarized as follows:

Cosmic radiation, which varies in intensity as a well-known function of altitude within the useful range of about 3 to 20 miles, penetrates both trays 1 and 2, and produces coincident pulses in the triodes 15 and 16, hence also in the two pentodes.

A single pulse in the voltage of conductor 11 is produced for each part of coincident pulses, but radiations that affect only one tray at a time have no effect on the said voltage. The lead plate 3 thus eliminates most other radiation that might vitiate the ultimate readings. The ballistic galvanometer 14 sums up the separate pulses that reach it, and its pointer takes a position indicative of the intensity of the cosmic radiation at any moment.

By reason of the proper calibration of this meter 14, it will indicate altitudes directly.

While the form of the invention at present preferred has been disclosed in detail, it must be remembered that this is merely an illustration of a single one of the many forms the invention may assume, and is in no sense to be considered as a limitation of the invention, whose scope is defined solely in and by the following claim.

We claim:

An altimeter comprising a set of Geiger tubes connected electrically in parallel and arranged in a single horizontal plane and adjacent one another; a second set of electrically-parallel-connected Geiger tubes substantially identical in all respects with the first set, and arranged in a single plane parallel to the first-mentioned plane, but vertically beneath the first set, a shield between said sets of tubes capable of preventing the passage of all natural radiation weaker than cosmic rays, whereby any simultaneous response of both sets of tubes designates the passage of a comic ray, a coincidence circuit connected to the said sets of tubes, an amplifier operated by said coincidence circuit and a ballistic galvanometer graduated in terms of altitude and operated by said amplifier, whereby an immediate average indication of altitude is given at all times.

JOHN W. B. BARGHAUSEN.
JAMES A. VAN ALLEN.

REFERENCES CITED

The following references are of record in the file of this patent:

UNITED STATES PATENTS

| Number | Name | Date |
| --- | --- | --- |
| 2,265,966 | Gebauer | Dec. 9, 1941 |
| 2,316,361 | Piety | Apr. 13, 1943 |
| 2,411,400 | Weber | Nov. 19, 1946 |
| 2,469,383 | Gibbs et al. | May 10, 1949 |

OTHER REFERENCES

Weisz et al.: Review of Scientific Instruments, June 1942, pages 258–263.

An Outline of Atomic Physics, Members of the Physics Staff of the University of Pittsburgh, John Wiley & Sons, Inc., New York, 1937, pages 293, 294, 298 and 299.

Introduction to Modern Physics, Richtmeyer and Kennard, McGraw-Hill Book Co., New York, 1947, page 681.